US011927046B2

(12) United States Patent
Zhu et al.

(10) Patent No.: US 11,927,046 B2
(45) Date of Patent: Mar. 12, 2024

(54) MULTI-ACCESS LIFTGATE

(71) Applicants: Magna Exteriors Inc., Concord (CA); Luyao Zhu, Troy, MI (US)

(72) Inventors: Luyao Zhu, Troy, MI (US); Marc Cogswell, Bloomfield Hills, MI (US); Robert M. Horner, Ferndale, MI (US)

(73) Assignee: Magna Exteriors Inc., Aurora (CA)

( * ) Notice: Subject to any disclaimer, the term of this patent is extended or adjusted under 35 U.S.C. 154(b) by 32 days.

(21) Appl. No.: 17/612,114

(22) PCT Filed: May 20, 2020

(86) PCT No.: PCT/US2020/033697
§ 371 (c)(1),
(2) Date: Nov. 17, 2021

(87) PCT Pub. No.: WO2020/236869
PCT Pub. Date: Nov. 26, 2020

(65) Prior Publication Data
US 2022/0242322 A1    Aug. 4, 2022

Related U.S. Application Data

(60) Provisional application No. 62/850,243, filed on May 20, 2019, provisional application No. 62/850,276, filed on May 20, 2019.

(51) Int. Cl.
*B60J 5/10* (2006.01)
*B60R 5/04* (2006.01)
(Continued)

(52) U.S. Cl.
CPC .............. *E05F 15/73* (2015.01); *B60J 5/101* (2013.01); *B60J 5/105* (2013.01); *B60R 5/04* (2013.01);
(Continued)

(58) Field of Classification Search
CPC ... B60J 5/101; B60J 5/103; B60J 5/104; B60J 5/105; B60J 5/041; B60R 5/04; B62D 25/087; E05Y 2900/532; E05Y 2900/546
(Continued)

(56) References Cited

U.S. PATENT DOCUMENTS 3,004,678 A   10/1961  Golaski
3,004,790 A * 10/1961  Mayer .................... B60R 5/041
                                                                296/76
(Continued)

FOREIGN PATENT DOCUMENTS

CN    101318523 A    12/2008
CN    201646568 U    11/2010
(Continued)

OTHER PUBLICATIONS

International Search Report for PCT/US2020/033697 dated Aug. 17, 2020, 2-pages.
(Continued)

*Primary Examiner* — Pinel E Romain
(74) *Attorney, Agent, or Firm* — Warn Partners, P.C.

(57) ABSTRACT

A multi-way liftgate assembly providing a plurality of dividers dividing the rear cargo area of a passenger vehicle into a plurality of secure areas assessable from a plurality of panels forming a liftgate to provide controlled access to one or more of those compartments. The vehicle operator has secure control of which portions of the cargo area can be selectively accessed. The multi-way liftgate assembly provides multiple secure openings to the cargo area of a vehicle that typically has only one secure opening to the cargo area.

17 Claims, 3 Drawing Sheets

(51) Int. Cl.
*B62D 25/08* (2006.01)
*E05F 15/73* (2015.01)
*E05F 15/75* (2015.01)
*E05F 15/76* (2015.01)

(52) U.S. Cl.
CPC ............ *B62D 25/087* (2013.01); *E05F 15/75* (2015.01); *E05F 15/76* (2015.01); *E05Y 2400/415* (2013.01); *E05Y 2400/44* (2013.01); *E05Y 2400/45* (2013.01); *E05Y 2400/822* (2013.01); *E05Y 2400/86* (2013.01); *E05Y 2900/532* (2013.01); *E05Y 2900/546* (2013.01)

(58) Field of Classification Search
USPC ................ 296/50, 51, 56, 146.4, 146.8, 106
See application file for complete search history.

(56) References Cited

U.S. PATENT DOCUMENTS

| | | | | |
|---|---|---|---|---|
| 5,150,939 | A * | 9/1992 | Simin | B62D 25/087 |
| | | | | 296/37.16 |
| 5,598,962 | A | 2/1997 | Schlachter | |
| 5,692,792 | A * | 12/1997 | Klar (minor) | B60J 5/101 |
| | | | | 296/37.16 |
| 5,876,086 | A * | 3/1999 | Lagrou | B60J 5/105 |
| | | | | 296/50 |
| 6,123,386 | A * | 9/2000 | Montone | B60J 5/105 |
| | | | | 292/336.3 |
| 6,666,497 | B2 * | 12/2003 | Ohba | E05D 5/062 |
| | | | | 16/261 |
| 7,631,921 | B2 * | 12/2009 | Lewis | B60J 5/101 |
| | | | | 296/51 |
| 2001/0022450 | A1 * | 9/2001 | Delavalle | B62D 43/04 |
| | | | | 296/37.1 |
| 2008/0122240 | A1 * | 5/2008 | Leroy | B60R 5/041 |
| | | | | 296/37.6 |
| 2008/0238122 | A1 * | 10/2008 | Leopold | B60R 5/041 |
| | | | | 296/56 |
| 2010/0264689 | A1 | 10/2010 | Lounds | |
| 2012/0068492 | A1 | 3/2012 | Lucas et al. | |
| 2017/0341586 | A1 | 11/2017 | Wang | |
| 2021/0155296 | A1 * | 5/2021 | Povinelli | B60Q 1/307 |
| 2021/0300252 | A1 * | 9/2021 | Fusco | B60R 5/041 |

FOREIGN PATENT DOCUMENTS

| | | | |
|---|---|---|---|
| DE | 4407131 A1 | 6/1995 | |
| DE | 19615540 A1 | 4/1997 | |
| DE | 10203539 A1 * | 8/2003 | ............. B60J 1/183 |
| DE | 102008023988 * | 9/2009 | ............ B60J 1/1861 |
| EP | 0365438 A1 * | 4/1990 | |
| JP | S6432921 A | 2/1989 | |

OTHER PUBLICATIONS

Search Report for Chinese Application No. 202080037958.1 dated Jul. 19, 2023, 3-pages.

Annex to EP Communication Pursuant to Article 94(3) for EP Application No. 20730534.3 dated Sep. 15, 2023, 2-pages.

* cited by examiner

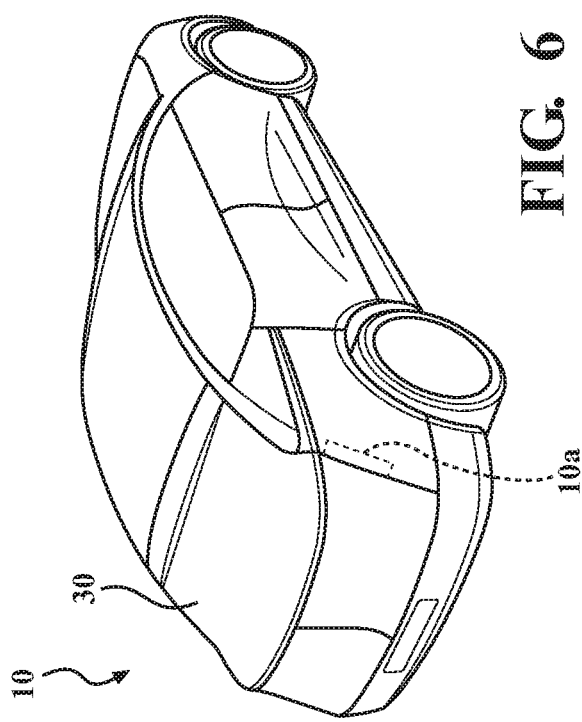
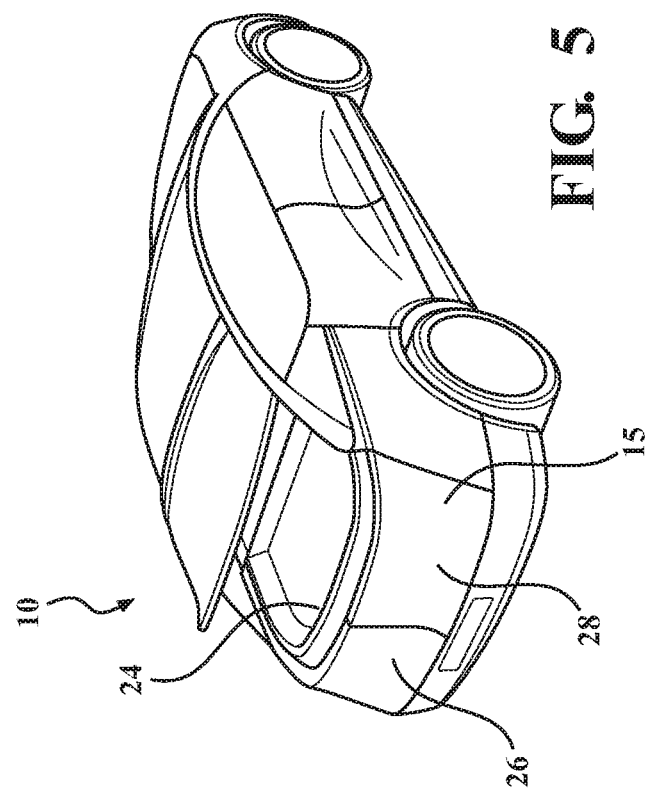

MULTI-ACCESS LIFTGATE

CROSS-REFERENCE TO RELATED APPLICATIONS

This application is a National Stage of PCT International Application No. PCT/US2020/033697, filed May 20, 2020 and claims benefit of U.S. Provisional Patent Application No. 62/850,243 filed May 20, 2019 and of U.S. Provisional Patent Application No. 62/850,276 filed May 20, 2019. The disclosures of the above applications are incorporated herein by reference.

FIELD OF THE INVENTION

The present invention relates to a tailgate system with multiple storage and access features integrated.

BACKGROUND OF THE INVENTION

Sport utility type vehicles with liftgate doors have become predominant in the vehicle market today. Liftgate doors typically open the entire rear compartment of an SUV vehicle which has proven very convenient to users of passenger vehicles.

In manufacturing, fitting and designing liftgates is complex because the doors are large and require robust hinging and locking mechanisms. The doors are also hard to fit during production. Thus, such doors are heavy and slow to open and close. Powered liftgates are also used in recent years which are also slow to open and close.

Therefore it is a goal in the art to provide access to the rear compartment in an SUV vehicle with a liftgate, which is limited, and is rapid for providing access to the rear compartment when it is not necessary to have the entire liftgate open.

Accordingly, there also exists a need for multi-way liftgate assembly incorporating dividing the rear cargo area of a passenger vehicle (e.g., SUV, Hatchbacks and Wagons) into a plurality of secure areas (e.g., at least three secure areas), using the liftgate to provide controlled access to one or more of those compartments.

SUMMARY OF THE INVENTION

In accordance with the present invention there is provided a liftgate access door which allows access to the rear compartment of an SUV type vehicle without requiring opening the entire liftgate.

According to further aspects of the present invention, dividing the rear cargo area of a passenger vehicle (SUV, Hatchbacks and Wagons, etc) into a plurality of secure areas (e.g., at least three secure areas) using the liftgate to provide controlled access to one or more of those multiple compartments.

The present invention provides liftgate access to multiple compartments. There is also provided a multi-way liftgate assembly providing a plurality of dividers dividing the rear cargo area of a passenger vehicle into a plurality of secure areas assessable from a plurality of panels forming a liftgate to provide controlled access to one or more of those compartments, in accordance with aspects of the present invention. The vehicle operator has secure control of which portions of the cargo area his fellow vehicle occupants can place and remove cargo from.

The vehicle operator has secure control of which portions of the cargo area his fellow vehicle occupants can place and remove cargo from.

BRIEF DESCRIPTION OF THE DRAWINGS

The present invention will become more fully understood from the detailed description and the accompanying drawings, wherein:

FIG. 5 is a perspective view of the multi-way liftgate assembly with an upper window open only, in accordance with the present invention;

FIG. 6, is a perspective view of the multi-way liftgate assembly in a completely closed position, in accordance with the present invention;

DETAILED DESCRIPTION OF THE PREFERRED EMBODIMENTS

Figure 1:
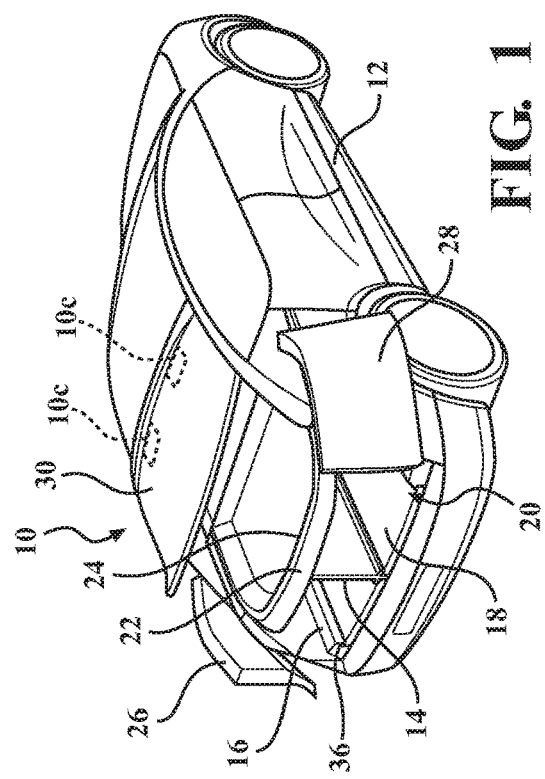
FIG. 1, is a perspective view of the multi-way liftgate assembly in a completely open position, in accordance with the present invention.

The following description of the preferred embodiment(s) is merely exemplary in nature and is in no way intended to limit the invention, its application, or uses.

Referring to FIGS. 1-10 generally, there is illustrated a multi-way liftgate assembly shown generally at 10 of a vehicle 12. SUV type vehicles 12 typically have a liftgate 15 which includes the entire back end of the vehicle having both an upper portion with a window and a lower portion which lift on hinges in an upward direction to reveal the entire rear end compartment. The liftgate assembly 10 provides at least one liftgate access door which allows access to the rear compartment of an SUV type vehicle without requiring opening the entire liftgate. The liftgate assembly 10 also provides access to storage solutions in the rear compartment, including sliding and/or divided features. The assembly 10 provides at least one divider dividing the rear cargo area of the vehicle, in accordance with aspects of the present invention. Preferably, a plurality of dividers dividing the rear cargo area of the vehicle into a plurality of secure areas assessable from a plurality of panels forming a liftgate to provide controlled access to one or more of those compartments. The vehicle operator has secure control of which portions of the cargo area can be selectively accessed. The multi-way liftgate assembly provides multiple secure openings to the cargo area of a vehicle that typically has only one secure opening to the cargo area.

Referring more particularly to FIGS. 1-6, there is illustrated a multi-way liftgate assembly 10 of the vehicle 12. According with aspects of the present invention there is provided the liftgate assembly 10 with at least one liftgate access door which allows access to the rear compartment 20 of the SUV type vehicle 12 without requiring opening the entire liftgate 15.

In accordance with aspects of the present invention, there are a plurality of liftgate access doors that are sub-rear end compartment sized (i.e., dividing the width between lateral sides of the liftgate 15 or dividing the height of the liftgate 15 or both). A first liftgate access door 26 and second liftgate access door 28 split the width about in half (i.e., the left side door being a mirror-image to the right-side door). The actual doors 26,28 are each operably actuated to open/close. The doors 26,28 open to open positions substantially parallel to opposing sides of the vehicle. According to aspects of the present invention, the first and second doors 26,28 are operably hinged 10a for opening to the sides of the vehicle 12. Alternatively, a suitable linkage mechanism for opening to the sides of the vehicle 12. Alternatively, or additionally, a suitable robust track system is provided for allowing the liftgate access doors to move out of the way of the rear end compartment 20. This allows the access doors to be opened and cargo to be inserted into the storage compartment 20 of the vehicle 12. The liftgate access doors 26,28 are openable automatically as is known to those skilled in the art or it is a manual opening door. Preferably, the liftgate access doors 26,28 are opened automatically, independently or simultaneously, by a remote or sensor which allows hands free operation. The remote signal is a remote control, motion sensor, touch sensor, key fob or keypad. In either manual or automatic configurations, the liftgate access doors 26,28 are of a smaller size and can be opened and closed rapidly with much less time and effort than the entire liftgate 15.

In a preferred embodiment of the present invention at least one cargo tray, preferably, a plurality of cargo trays is provided to assist in loading of cargo 50. A first and a second cargo tray 32 and 34 are either manually or automatically operably slid in and out of the rear end cargo compartment as illustrated in the drawings. A suitable robust extendable track system is provided for allowing the cargo trays 32,34 to support a cargo load 50 when extended (e.g., incorporating track system 16/38 and 40/41, respectively)

Thus, in operation either or both of the doors 26 and/or 28 are opened quickly and either or both of the cargo trays 32 and/or 34 are deployed, a carry-on bag or other luggage or other cargo 50 is placed on either of the cargo trays 32,34 and then the trays 32,34 slides into the cargo compartment 20. Thereafter the doors 26,28 are closed and the vehicle 12 is ready for transport. It is understood that the trays 32,34 do not always need to be extended to place the cargo 50 unless desired.

In accordance with aspects of the present invention, a third liftgate access door 27 is provided (e.g. less than the overall height of the liftgate 15). The actual door 27 is operably actuated to open/close. According to aspects of the present invention, the third liftgate access door 27 is operably hinged 10c,10c for folding upward. This allows for the third liftgate access door 27 to be opened and cargo to be inserted into the storage compartment 20 or into an additional rear storage compartment 24 of the vehicle 12 (e.g., at least one upper compartment). The liftgate access door 27 is openable automatically as is known to those skilled in the art or it is a manual opening door. Preferably, the liftgate access door 27 is opened automatically by a remote or sensor which allows hands free operation. The remote signal is a remote control, motion sensor, touch sensor or keypad. In either manual or automatic configurations, the liftgate access door 27 is of a smaller size and can be opened and closed rapidly with much less time and effort than the entire liftgate 15. The additional compartment 24 includes no tray, however, it is contemplated that the compartment 24 could be adapted to house at least one slidable tray similar to previously described without departure from the scope of the present invention.

It is understood that more or less trays 32,34 are contemplated depending on the particular applications without departure from the scope of the present invention.

According to the present invention, at least one divider divides the rear end storage compartment 20. At least one first divider 14 (e.g., substantially vertical divider(s), horizontal divider(s), angled divider(s), central divider, more than one divider, any combination of dividers, etc) divides the compartment area into a first and second compartment 16 and 18 (e.g., left and right compartments, side-by-side left/right, up/down, row, line, etc).

At least one second divider 22 (e.g., substantially horizontal divider(s), horizontal divider(s), angled divider(s), central divider, more than one divider, any combination of dividers, etc) divides the compartment area 20 into at least a third compartment 24 (e.g., at least one top compartment, at least one lower compartment, etc), according to aspects of the present invention.

Figure 2:
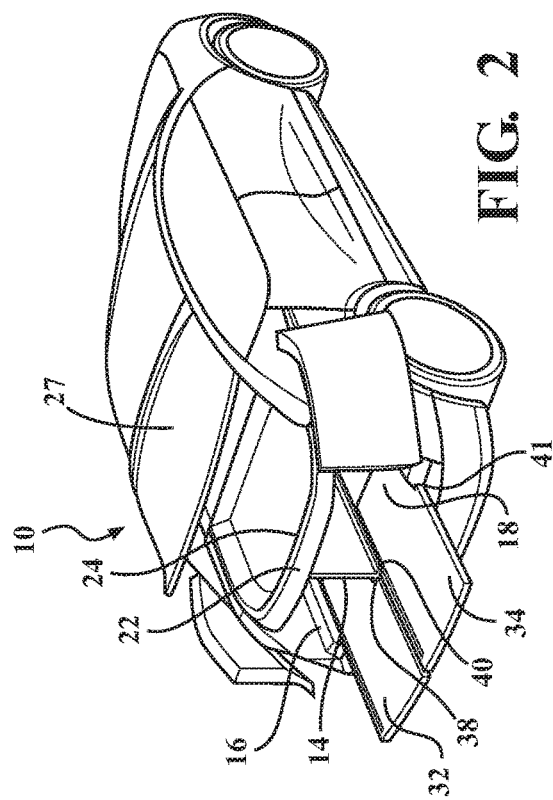
FIG. 2 is a perspective view of the multi-way liftgate assembly in a completely open position with cargo trays deployed, in accordance with the present invention.
Figure 3:
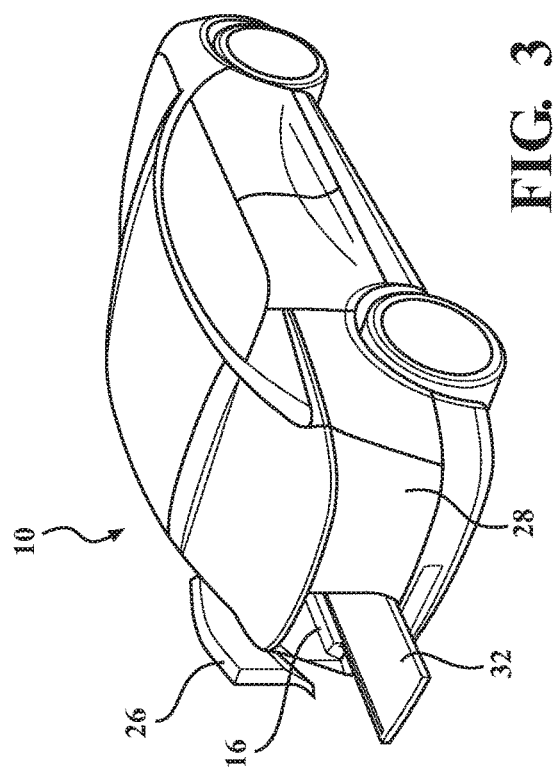
FIG. 3 is a perspective view of the multi-way liftgate assembly with a left side open only, in accordance with the present invention.
Figure 4:
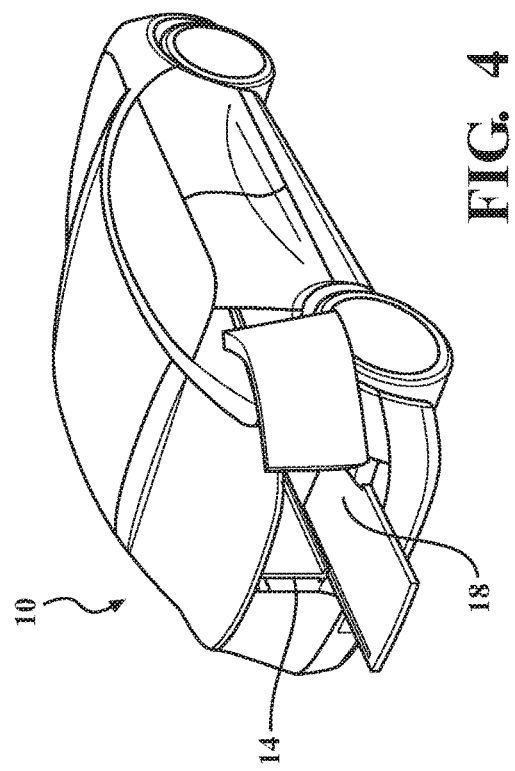
FIG. 4 is a perspective view of the multi-way liftgate assembly with a right side open only, in accordance with the present invention.
Figure 8:
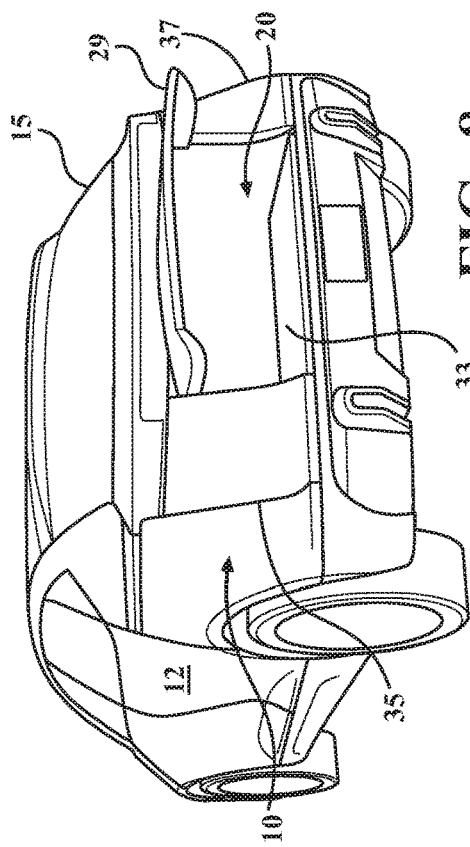
FIG. 8 is a perspective view of the SUV vehicle showing the liftgate access door of the present invention in an open configuration.
Figure 10:
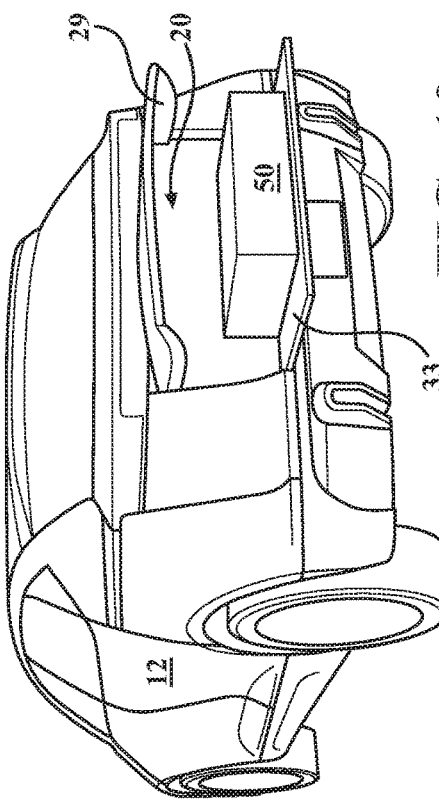
Figure 7:
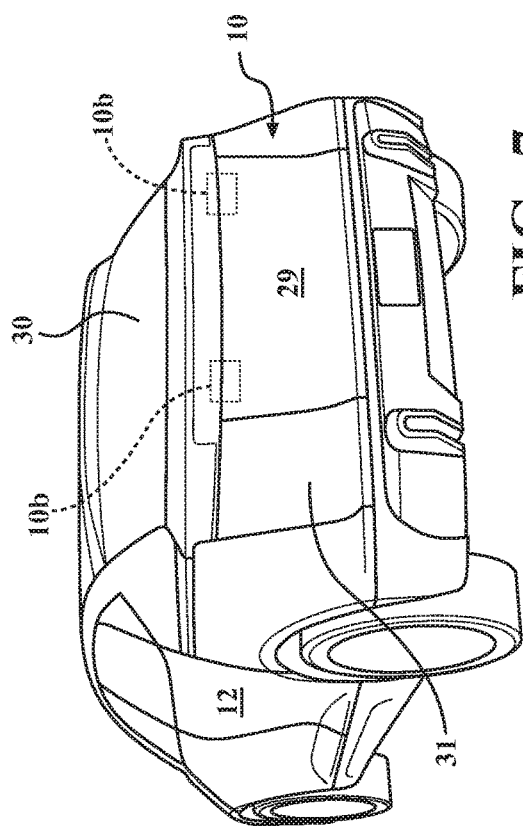
FIG. 7 is a rear perspective view of an SUV vehicle having a liftgate access door in accordance with the teachings of the present invention.
Figure 9:
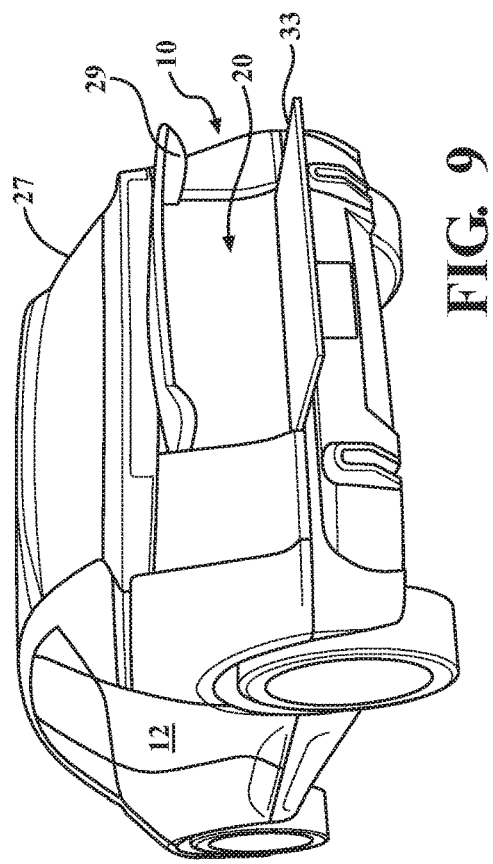
FIG. 9 is a rear perspective view of an SUV vehicle showing the liftgate access door open with a cargo tray feature deployed; and, FIG. 10 is rear perspective view similar to FIG. 9 showing a package being placed ready for storage in the cargo compartment of the SUV vehicle.

The liftgate assembly 10 includes the at least one liftgate access without having to lift the entire liftgate 15. FIG. 1 depicts all three liftgate access doors 26,28,27 in an exemplary fully open position allow access into the first, second and third 16,18,24 compartments. FIG. 2 depicts the first and second trays 32,34 extended out to receive cargo. FIG. 3 depicts exemplary access to the first compartment 16 when the first liftgate access door 26 is articulated to the side to an open position and the second door 28 remains closed. FIG. 4 depicts exemplary access to the second compartment 18 when the second liftgate access door 28 is articulated to the other side to an open position and the first door 26 remains closed. FIG. 5 depicts the third liftgate access door 27 opened upward to load cargo into the third compartment 24. FIG. 6 depicts the liftgate system 10 in a fully closed position.

Preferably, the first and second access doors 26,28 are a liftgate composite material and the third access door 27 includes a window 30. It is understood that any suitable materials are contemplated depending on the application without departure from the scope of the present invention (e.g., aluminum, plastics, glass, reinforced fiber filled material, lightweight molded material, etc and combinations thereof).

The vehicle operator has secure control of which portions of the cargo area passengers can place and remove cargo from. The present invention gives the ability to provide multiple secure openings to the cargo area of a vehicle that typically has only one secure opening to the cargo area. By separating the exterior surface into three distinct access portions and remotely controlling access to those doors, the vehicle operator has greater control of allowing access to cargo in the rear storage areas and can even provide remote access using smart phone, smart watch technology or any other smart device, application and platform Preferably, the assembly 10 includes suitable robust hinging systems operably adapted for the two lower access doors (e.g., 26 and 28) to be opened in dense parking situations.

Preferably, the assembly 10 includes at least one vertical divider (e.g., 14) and, most preferably, at least one horizontal divider (e.g., 22) to separate the rear end storage compartment area 20 of a SUV, hatchback or wagon or any other type of vehicle into at least three distinct compartments (e.g., 16,18,24). It is understood that any other divider configuration and orientation is contemplated depending on the application without departure from the scope of the present invention (e.g., angled, zig-zag, square, rectangular, triangular, honeycomb, a plurality of vertical dividers, a plurality of horizontal dividers and any other suitable divider and combinations thereof.

The dividers are preferably plastic. It is understood that any other divider material is contemplated depending on the application without departure from the scope of the present invention (e.g., netting, mat, rubber, sailcloth, fabric, cardboard reinforced wrapped fabric panel, canvas, tote, aluminum, metal, and any other suitable divider and combinations thereof. Optionally, the dividers are removable by a user, when desired. Optionally, the dividers can be selectively reconfigured by a user, when desired.

While a 3-way liftgate is shown and described, it is understood that more or less than three liftgate access doors are contemplated depending on the particular applications without departure from the scope of the present invention. The assembly 10 is at least a 2-way liftgate. Most preferably, a 3-way liftgate.

It is understood that any aspect(s) of FIGS. 1-6 are operably adaptable and combined depending on the particular application without departure from the scope of the present invention. It is further understood that any of the aspects of FIGS. 1-6 are operably adoptable and combinable with any aspects of FIGS. 7-10, alone or in any combination(s), depending on the application without departure from the scope of the present invention.

Referring to all of the FIGS. 1-10 generally, and more particularly to FIGS. 7-10, in accordance with aspects of the present invention there is provided the liftgate assembly indicated generally at 10 with at least one liftgate access door 29 which allows access to the rear compartment 20 of the SUV type vehicle 12 without requiring opening the entire liftgate 15.

SUV type vehicles 12 are known which typically have a liftgate 15 which includes the entire back end of the vehicle having both the window portion 30 and a lower portion 31 and has edges 35 and 37 on lateral sides. The window 30 and lower portion 31 lift on hinges in an upward direction to reveal the entire rear end compartment 20.

In the present invention the liftgate access door 29 is sub-rear end compartment sized (i.e. less than the width between gate edges 35 and 37). Preferably, the liftgate access door 29 is about the size of at least a carry-on luggage bag as defined by airplane carry on standard sized luggage. As shown in the drawings the actual door 29 has a plurality of hinges 10b for folding upward. This allows for the liftgate access door 29 to be opened and carry-on luggage bag 50 to be inserted into the storage compartment 20 of the vehicle 12. The liftgate access door 29 is openable automatically as is known to those skilled in the art or it is a manual opening door. Preferably, the liftgate access door 29 is opened automatically by a remote or sensor which allows hands free operation. The remote signal is a remote control, motion sensor, touch sensor or keypad. In either manual or automatic configurations, the liftgate access door 29 is of a smaller size and can be opened and closed rapidly with much less time and effort than the entire liftgate 15.

In a preferred embodiment of the present invention a cargo tray 33 is provided to assist in loading of cargo 50. Cargo tray 33 either manually or automatically operably slides in and out of the cargo compartment as illustrated in the drawings. A suitable robust extendable track system is provided for allowing the cargo tray 33 to support a carry load 50 when extended (e.g., incorporating system 40.41).

Thus, in operation the door 29 is opened quickly and the cargo tray 33 deployed, the carry-on bag or other luggage 50 is placed on the cargo tray 33 and then slides into the cargo compartment 20. Thereafter the door 29 is closed and the vehicle 12 is ready for transport.

It is understood that any aspect(s) of FIGS. 7-10 are operably adaptable and combined depending on the particular application without departure from the scope of the present invention. It is further understood that any of the aspects of FIGS. 7-10 are operably adoptable and combinable with any aspects of FIGS. 1-6, alone or in any combination(s), depending on the particular application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multiple-access liftgate assembly adapted for a vehicle, comprising:
   a plurality of liftgate access doors which selectively allows a plurality of predetermined access to a plurality of rear compartments without requiring opening an entire liftgate exterior;
   wherein at least two of the plurality of liftgate access doors are operably hinged to open the doors in a direction toward sides of the vehicle to open positions substantially parallel to opposing sides of the vehicle.

2. The multiple-access liftgate assembly of claim 1, wherein each of said liftgate access doors is less wide than sides of the liftgate exterior.

3. The multiple-access liftgate assembly of claim 2, wherein the liftgate access door is sized to accommodate loading a carry-on bag.

4. The multiple-access liftgate assembly of claim 1, wherein one of said liftgate access doors is hinged for lifting upward.

5. The multiple-access liftgate assembly of claim 1, wherein an outward side of said at least one of said liftgate access doors is adapted to be operably hinged.

6. The multiple-access liftgate assembly of claim 1, wherein at least one cargo shelf is mounted at a base of at least one of the rear compartments for selectively sliding out for receiving cargo.

7. The multiple-access liftgate assembly of claim 6, wherein the at least one cargo shelf is slidably operably mounted to a track mechanism.

8. The multiple-access liftgate assembly of claim 1, wherein said plurality of liftgate access doors is selectively automatically opened in response to a remote signal.

9. The multiple-access liftgate assembly of claim 8, wherein the remote signal is a remote control, motion sensor, touch sensor, key fob, keypad or smart device.

10. The multiple-access liftgate assembly of claim 1, wherein at least one of said plurality of liftgate access doors is at least one upper liftgate access door adapted to be operably hinged to the vehicle which allows access to at least one of said plurality of rear compartments without requiring opening the entire liftgate exterior.

11. The multiple-access liftgate assembly of claim 1, further comprising at least one divider separating said plurality of rear compartments into a plurality of individual secure areas.

12. The multiple-access liftgate assembly of claim 1, wherein the plurality of individual secure areas are accessible from respective liftgate access doors.

13. A multiple-access liftgate assembly adapted for a vehicle, comprising:
   a plurality of liftgate access doors in a liftgate exterior which allows selectively predetermined sub-liftgate sized access to a rear compartment portion operably adapted for the vehicle without requiring opening of the entire liftgate exterior to access said rear compartment portion;
   wherein at least one of said at least one liftgate access doors is operably adapted to be hinged for selectively opening to substantially parallel to a side of the vehicle.

14. The multiple-access liftgate assembly of claim 13, wherein at least one of said plurality of liftgate access doors is at least one upper liftgate access door allowing access to a separate secure area of the rear compartment portion.

15. A multiple-access liftgate assembly operably adapted for a vehicle, comprising:
   at least one rear cargo compartment;
   at least one divider splitting the rear cargo compartment into a plurality of separate secure areas;
   a plurality of liftgate access doors formed in a liftgate exterior to allow access into respective secure compartment areas without requiring opening the entire liftgate exterior;
   wherein at least two of the plurality of liftgate access doors are operably hinged to open the doors in a direction toward sides of the vehicle to open positions substantially parallel to opposing sides of the vehicle.

16. The multiple-access liftgate assembly of claim 15, wherein said liftgate access door automatically opens in response to a signal.

17. The multiple-access liftgate assembly of claim 15, further comprising at least one tray mounted within each secure compartment area for sliding in/out for loading/unloading cargo.

* * * * *